(12) United States Patent
Meng et al.

(10) Patent No.: US 10,914,824 B2
(45) Date of Patent: Feb. 9, 2021

(54) SYSTEMS AND METHODS FOR MEASURING A TIME OF FLIGHT IN A LIDAR SYSTEM

(71) Applicant: Analog Devices International Unlimited Company, Limerick (IE)

(72) Inventors: Libo Meng, Shanghai (CN); Qingdong Meng, Belmont, MA (US); Wei Wang, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 449 days.

(21) Appl. No.: 15/819,976

(22) Filed: Nov. 21, 2017

(65) Prior Publication Data

US 2019/0154812 A1    May 23, 2019

(51) Int. Cl.
*G01S 7/48* (2006.01)
*G01S 7/4865* (2020.01)
(Continued)

(52) U.S. Cl.
CPC .......... *G01S 7/4865* (2013.01); *G01S 7/4861* (2013.01); *G01S 7/4863* (2013.01); *G01S 17/14* (2020.01)

(58) Field of Classification Search
CPC ........ G01S 7/487; G01S 17/10; G01S 7/4861; G01S 7/4865; G01S 7/003; G01C 3/08
See application file for complete search history.

(56) References Cited

U.S. PATENT DOCUMENTS 5,102,219 A * 4/1992 Skagerlund ............. G01S 17/18
356/5.08
5,530,539 A * 6/1996 Hug .................... G01R 29/0892
342/135
(Continued)

FOREIGN PATENT DOCUMENTS

JP     2010197118 A    9/2010
JP     2015152428 A    8/2015
(Continued)

OTHER PUBLICATIONS

Translation for JP 2016-099233A (Year: 2016).*
(Continued)

*Primary Examiner* — Luke D Ratcliffe
(74) *Attorney, Agent, or Firm* — Schwegman Lundberg & Woessner, P.A.

(57) ABSTRACT

A lidar system can be used to measure a distance to one or more objects in a target region, such as by transmitting light towards the target and then receiving light reflected or scattered from the target. Received light can be stored as charge on storage elements such as capacitors, where received light can be stored on different storage elements
(Continued)

depending on a time of arrival of the received light. A reduction in the number of storage elements can be achieved by providing one or more groups of storage elements, where each group of storage elements can correspond to a digit of a time of flight, where the time of flight can be round trip travel time of a light beam travelling from the lidar system to the target region and then back to the lidar system. Each group of storage elements can be arranged in a binary tree of a decimal tree configuration. Additionally, a time of activation of each of the storage elements can be increased with an increasing time of flight, such as to compensate for a decreased strength of the received light as the time of flight increases.

20 Claims, 6 Drawing Sheets

(51) Int. Cl.
  *G01S 7/4863*    (2020.01)
  *G01S 7/4861*    (2020.01)
  *G01S 17/14*     (2020.01)

(56) References Cited

U.S. PATENT DOCUMENTS

| | | | |
|---|---|---|---|
| 9,086,275 | B2 | 7/2015 | Weinberg et al. |
| 2010/0277713 | A1* | 11/2010 | Mimeault ............... G01S 7/487 |
| | | | 356/5.01 |
| 2013/0258312 | A1* | 10/2013 | Lewis .................... G01S 17/10 |
| | | | 356/4.01 |
| 2015/0293228 | A1 | 10/2015 | Retterath et al. |

FOREIGN PATENT DOCUMENTS

| | | | |
|---|---|---|---|
| JP | 2016099233 A | * | 5/2016 |
| WO | WO-2017141957 A1 | | 8/2017 |

OTHER PUBLICATIONS

"Japanese Application Serial No. 2018-217213, Notification of Reasons for Refusal dated Jan. 14, 2020", W/ English Translation, 8 pgs.

"Japanese Application Serial No. 2018-217213, Response filed Apr. 14, 2020 to Notification of Reasons for Refusal dated Jan. 14, 2020", w/ English Claims, 7 pgs.

* cited by examiner

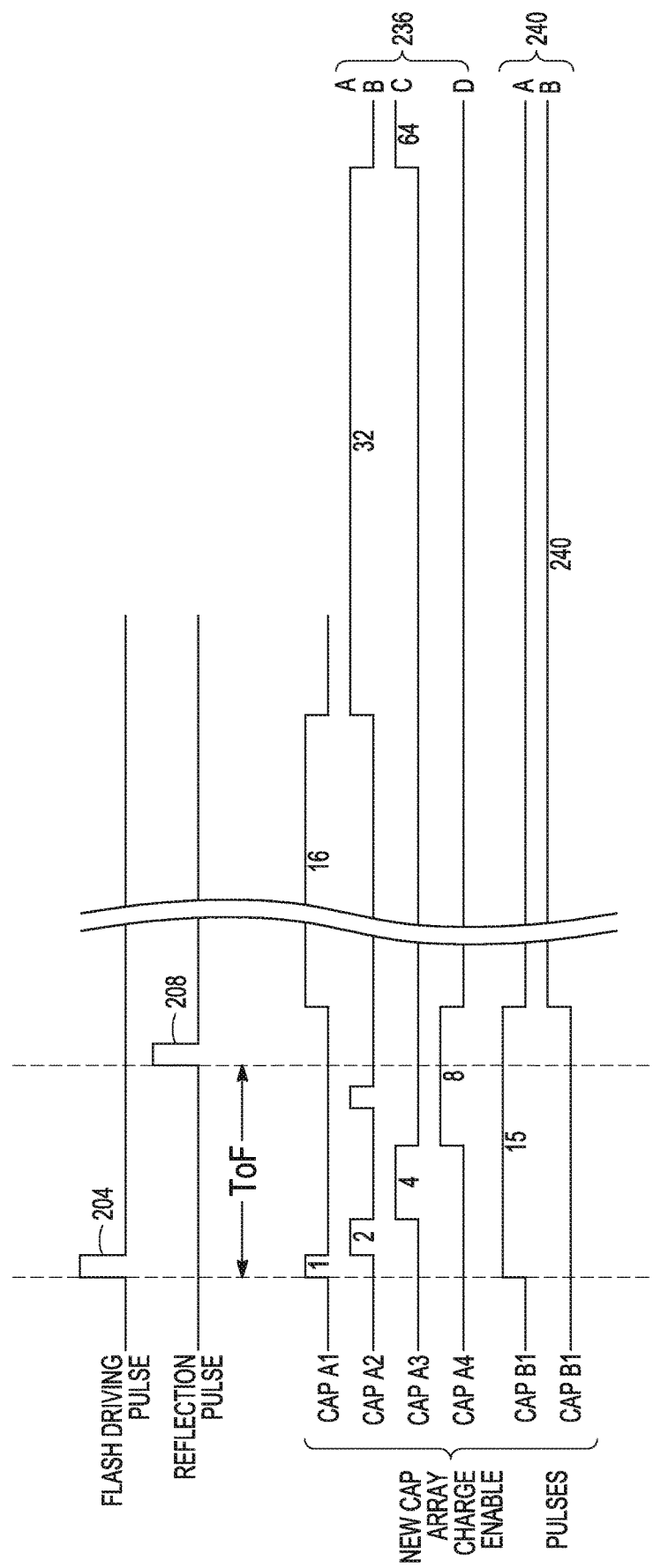

SYSTEMS AND METHODS FOR MEASURING A TIME OF FLIGHT IN A LIDAR SYSTEM

FIELD OF THE DISCLOSURE

The present disclosure relates to systems and methods for measuring a time of flight in a lidar system.

BACKGROUND

Certain lidar systems can use proportional or sequential capacitor storage, such as to measure a time of flight of a lidar pulse. The proportional or sequential capacitor storage may require a high signal-to-noise analog-to-digital converter or a large number of storage capacitors.

SUMMARY OF THE DISCLOSURE

A lidar system can be used to measure a distance to one or more objects in a target region. The lidar system can emit a pulse of light, and the pulse of light can then be reflected by an object in the target region. The reflection can be received by a light sensitive element, such as a photodiode. The lidar system can then determine a time taken by the pulse of light to travel to the target region and hack. This time can be referred to as a time of flight. In certain systems, storage elements can be used to store charge received from the light sensitive element, and each storage element can correspond to a time interval. By increasing the number of storage elements in such systems, a time of flight can be measured more accurately. However, the increased number of storage elements can undesirably consume considerable space on an integrated circuit—e.g., as much as ⅓ the space of an IC chip area, and can also suffer from a timing tree balance problem. A timing tree balance problem can occur when a large number of capacitors can be distributed in different regions of a chip, such as which can lead to a large variance in clock signal paths or control signal paths. The large variance in clock signal paths or control signal paths can lead to difficulties in balancing timing and routing. The present inventors have recognized, among other things, the need for a lidar system that can use a reduced number of storage elements, while maintaining a desired time of flight resolution.

In an aspect, the disclosure can feature a method for determining a round trip travel time of a light beam in a lidar system. The method can include activating individual storage elements in a first group of storage elements. Each individual storage element can be activated during a plurality of first time intervals. Each of the plurality of first time intervals can have a first duration. The method can include activating individual storage elements in a second group of storage elements. Each individual storage element can be activated during one of a plurality of second time intervals. Each of the plurality of second time intervals can have a second duration longer than the first duration. The method can also include determining a round trip travel time of the light beam, such as can be based on determined individual storage elements from the first and second group of storage elements corresponding to a received portion of the light beam. Each of the determined individual storage elements from the first and second group of storage elements can correspond to a different digit of the round trip travel time. The second duration can be at least two times the length of the first duration. The method can include determining an individual storage element from the first group of storage elements, such as can be activated during a plurality of first time intervals corresponding to the received portion of the light beam. The method can include deter mining an individual storage element from the second group of storage elements, such as can be activated during one of the second time intervals corresponding to the received portion of the light beam. The method can include determining an $n^{th}$ element from the first group and an $m^{th}$ element from the second group corresponding to a received portion of the light beam and determining a round trip travel time, such as by summing a product of n and a length of the first time interval and a product of m and a length of the second time interval.

In an aspect, the disclosure can feature a method for determining a round trip travel time of a light beam in a lidar system. The method can include activating individual storage elements in successive groups of storage elements, where a storage element in a group can be activated for a longer time interval than a storage element in a preceding group. The method can include determining a round trip travel time of the light beam, such as based on determined individual storage elements from each successive group of storage elements corresponding to a received portion of the light beam. A storage element can be activated for a time interval at least twice the length of a time interval of activation of storage elements in a preceding group. The method can include repeatedly activating individual storage elements in a first one of the successive groups of storage elements. A storage element in a second group of the successive groups of storage elements can be repeatedly activated for a time interval, such as that corresponding to activation of each of the individual storage elements in the first one of the successive groups of storage elements. The method can include activating individual storage elements in at least one of the successive groups of storage elements for a variable time interval. The method can include activating individual storage elements in at least one of the successive groups of storage elements for a time interval that varies exponentially. Each successive group of storage elements can include an exponentially smaller number of storage elements than a preceding group of storage elements.

In an aspect the disclosure can feature a system for determining a round trip travel time of a light pulse in a lidar system. The system can include a light transmission system that can be configured to emit a pulse of light towards a target. The system can include a receiver that can be configured to receive a pulse of light from the target. The system can include a first group of storage elements. The system can include a second group of storage elements. The system can include control circuitry that can be configured to activate individual storage elements in the first group of storage elements. Each individual storage element can be activated during a corresponding plurality of first time intervals. Each of the corresponding first time intervals can have a first duration. The control circuitry can be configured to activate individual storage elements in the second group of storage elements. Each individual storage element can be activated during one of a plurality of second time intervals. Each of the plurality of second time intervals can have a second duration longer than the first duration. The control circuitry can configured to determine a round trip travel time of the light pulse, such as based on the individual storage elements from the first and second group of storage elements corresponding to a received portion of the light pulse. The first group of storage elements can correspond to a first digit of the round trip travel time and the second group of storage elements correspond to a second digit of the round trip travel time. The first group and second group of storage elements can be arranged in a decimal tree or binary tree configuration. The control circuitry can be configured to determine an individual storage element from the first group of storage elements, such as can be activated during a plurality of first time intervals corresponding to the received portion of the light beam. The control circuitry can be configured to determine an individual storage element from the second group of storage elements, such as can be activated during one of the second time intervals corresponding to the received portion of the light beam. The control circuitry can be configured to determine an $n^{th}$ element from the first group and an re element from the second group corresponding to a received portion of the light beam and determine a round trip travel time, such as by summing a product of n and a length of the first time interval and a product of m and a length of the second time interval. A number of the first group of storage elements can be exponentially larger than a number of storage element in the second group of storage elements. The system can include a third group of storage elements. The control circuitry can be configured to activate individual storage elements in the third group of storage elements. Each individual storage element can be activated during one of a plurality of third time intervals. Each of the plurality of third time intervals can have a third duration shorter than the first duration. The control circuitry can be configured to determine a round trip travel time of the light pulse, such as based on the individual storage elements from the first, second, and third group of storage elements corresponding to a received portion of the light pulse.

BRIEF DESCRIPTION OF THE DRAWINGS

The present disclosure will now be described, by way of example, with reference to the accompanying drawings, in which:

FIG. 19 illustrates an example of determining a e of flight distance in a lidar system.

FIGS. 2A-2D illustrate an example of operation of a lidar system.

DETAILED DESCRIPTION

A lidar system can be used to measure a distance to one or more objects in a target region by emitting a pulse of light that can then be reflected by an object in the target region and received by a light sensitive element, such as a photodiode. The lidar system can then determine a time of flight taken by the pulse of light to travel to the target region and back using a reduced number of storage elements to store charge received from the light sensitive element, where each storage element can correspond to one or more time intervals, while maintaining a desired time of flight resolution. A reduction in the number of storage elements can be achieved by providing one or more groups of storage elements. The one or more groups of storage elements can be operated, such as to store charge corresponding to the light received at the lidar system. Each group of storage elements can correspond to a digit of a number representative of the time of flight.

Figure 1A:
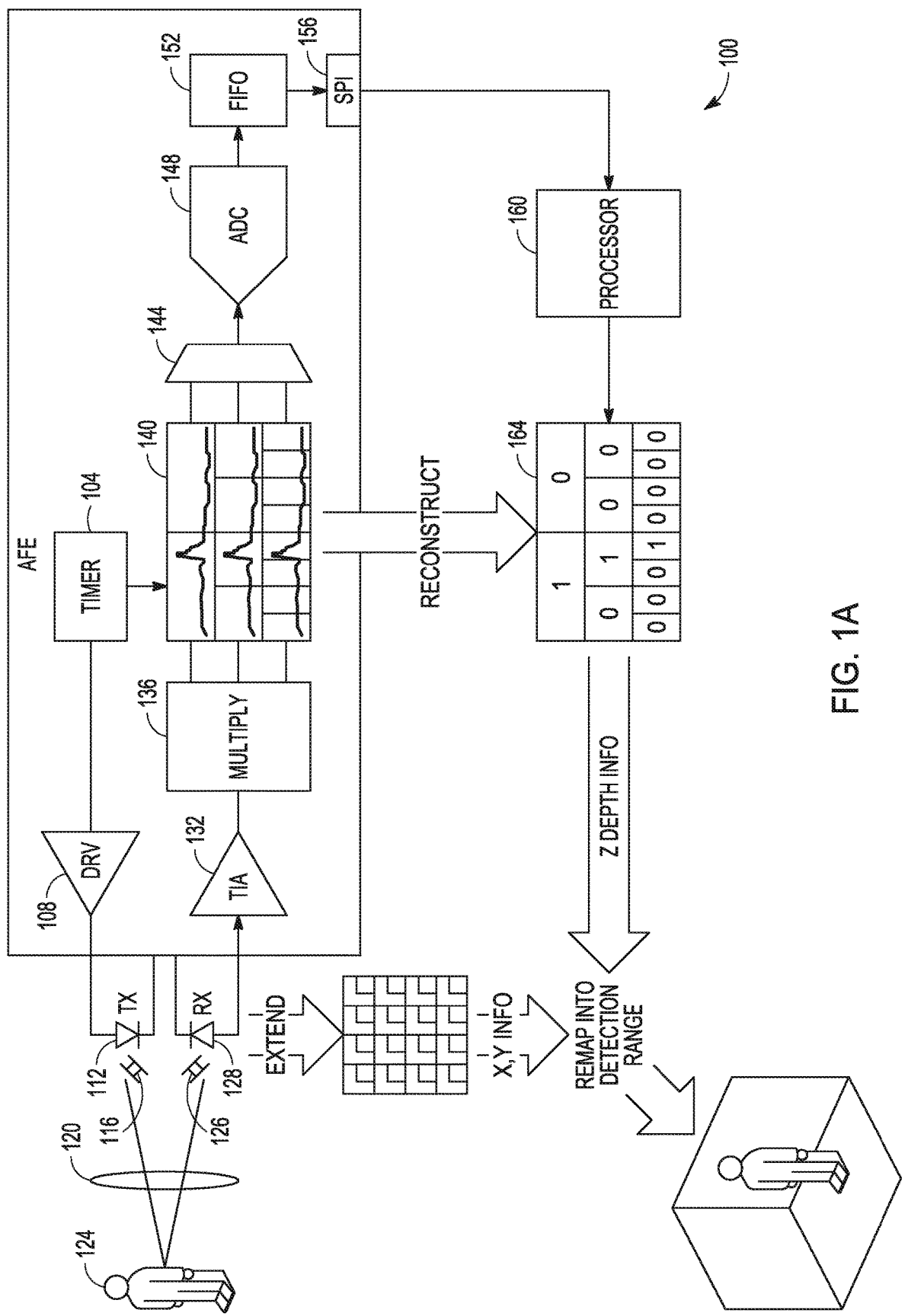
FIG. 1A illustrates an example of a lidar system.

FIG. 1A illustrates an example of portions of a lidar system 100. The lidar system 100 can include or use a timer 104, a driver 108, a transmitter 112 to provide an emitted light pulse 116 to a target 124 via an optical system 120, a receiver 128, a transimpedance amplifier 132, a multiplier 136, a storage array 140, a multiplexer 144, an analog-to-digital converter 148, a buffer 152, an interface 156, and a processor 160. The transmitter 112 can include one or more infrared light emitting diodes or infrared laser diodes. The receiver 128 can include one or more photodiodes (e.g., an array of photodiodes). The timer 104 can be connected to the driver 108 and to the storage array 140. The driver 108 can be connected to the transmitter 112. The receiver 128 can be connected to the transimpedance amplifier 132. The transimpedance amplifier 132 can be connected to the multiplier 136. The multiplier 136 can be connected to the storage array 140. The storage array can be connected to the multiplexer 144. The multiplexer 144 can be connected to the analog-to-digital converter 148. The analog-to-digital converter 148 can be connected to the buffer 152. The buffer 152 can be connected to the interface 156. The interface 156 can be connected to the processor 160. During operation, the timer 104 can provide an electrical signal to the driver 108, and in response the driver 108 can provide an electrical driving signal to the transmitter 112. The transmitter 112 can then provide an emitted light pulse 116 in response to the electrical driving signal. The emitted light pulse 116 can then pass through the optical system 120 (e.g., one or more lenses) before travelling towards the target 124. The target 124 can reflect or scatter a portion of the emitted light pulse 116. The receiver 128 can receive a reflected or scattered light pulse 126 that corresponds to a portion of the emitted light pulse from the target 124. The received light pulse 126 can then be converted to a voltage, such as by the transimpedance amplifier 132, which can be multiplied by the multiplier 136. The output of the multiplier 136 can be provided to the storage array 140, such as to charge one or more capacitors in the array. The timer 104 can provide a time varying electrical signal to the storage array 140, such as can be used to select or activate one or more capacitors for charging. The charge stored on the one or more capacitors can correspond to an arrival of the received portion of the emitted light pulse 116. The charge stored on the capacitors can then be provided to the multiplexer 144 and a resulting signal can then be digitized by the analog-to-digital converter 148 and provided to the processor 160, such as via the buffer 152 and the 156. The processor 160 can then determine which of the capacitors correspond to the received light pulse 126. A round trip travel time of the emitted light pulse 116 can then be determined based on this determination of which capacitors correspond to the received light pulse 126.

Figure 1B:
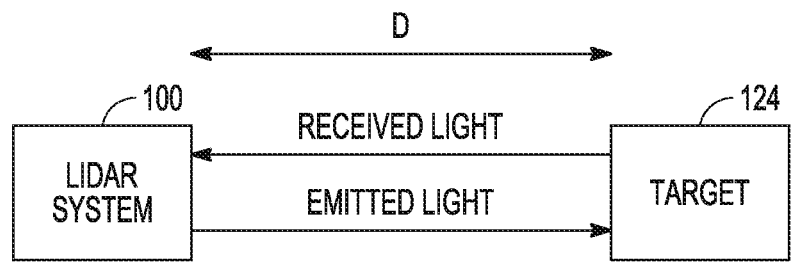
FIG. 1C illustrates an example of operation of storage elements in a lidar system.

FIG. 1B illustrates an example of how a distance to the target 124 can then be determined, such as according to the expression $d=ct/2$, in which d can represent a distance from the lidar system 100 to the target 124, t can represent a round trip travel time, and c can represent a speed of light. In an example in which the receiver 128 includes an array of photodiodes, a distance can be determined for each segment in a two-dimensional field of view corresponding to the target 124. Such information can then be used to reconstruct a three-dimensional image corresponding to the target.

Figure 1C:
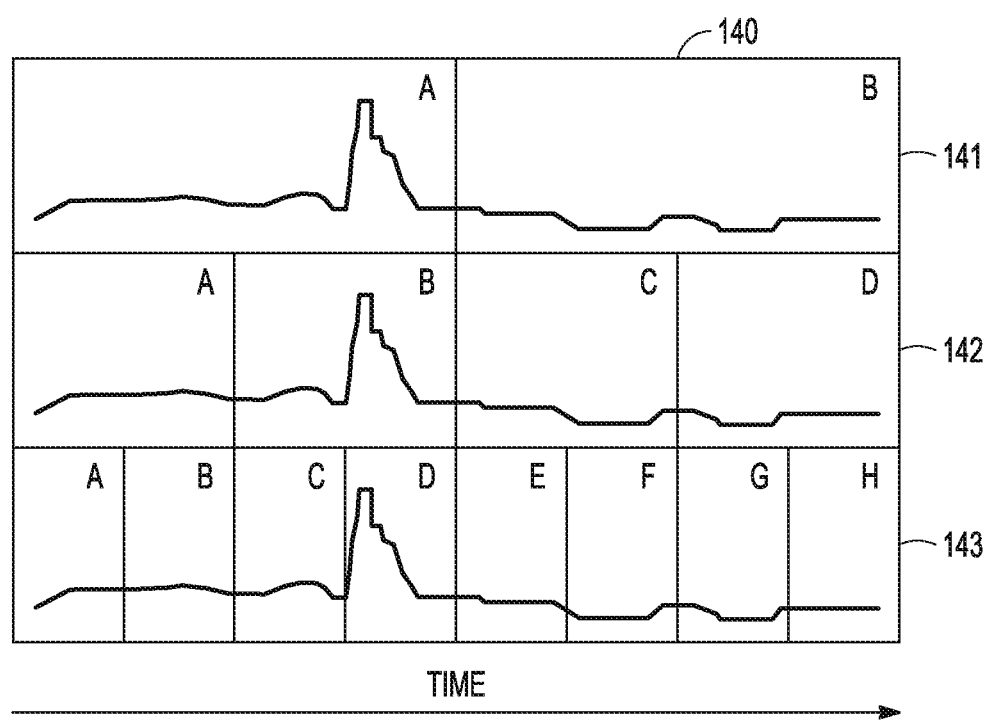

FIG. 1C illustrates a more detailed diagram of an example of operating the storage array 140, such as by grouping capacitors in the storage array 140 for use for signal recording according to different time epochs 141, 142, 143, such as can overlap in a binary or other tree structure, such as the binary tree structure shown in FIG. 1C and explained below. The storage array 140 can include one or more groups of storage elements, such as a first group 153, a second group 152, and a third group 151. Although three groups are described herein, any number of groups may be used. These different groups can be configured to represent different time epochs for receiving the reflected lidar pulse, and can be arranged in a time-overlapping manner such as to represent a numerical "place value" of a specified numbering schema, such as binary, decimal, etc., such as explained herein. In a binary tree example, such as illustrated in FIG. 1C, the first group 153 can include two storage elements 153a and 153b, the second group 152 can include two storage elements 152a and 152b, and the third group 151 can include two storage elements 151a and 151b. Although each group is shown as having two storage elements, any number of storage elements may be used. A number of activations per storage element can vary across groups, such as to represent the different time epochs. While activated, each storage element can store a charge. After a determination of a distance in the two-dimensional field of view corresponding to the target 124, a storage element can be discharged and/or reset.

In the binary tree example shown in FIG. 1C, the number of activations per storage element can vary exponentially. For example, each storage element 153a and 153b in the first group 153 can be alternatingly activated $2^2$ times to alternatingly represent the Group 1 time epochs 143a-h. Each storage element 152a and 152h of the second group 152 can be alternatingly activated $2^1$ times to alternatingly represent the Group 2 time epochs 142a-d. Each storage element 151a and 151b of the third group can be alternatingly activated $2^0$ times to alternatingly represent the Group 3 time epochs 141a-b, and so on.

During operation of the binary tree example shown in FIG. 1C, the timer 104 can alternatingly activate the storage elements in the first group 153, such that only one storage element of the pair of storage elements 153a and 153b of the first group 153 is activated during each of the time intervals 143a-h. A first storage element 153a of the pair of storage elements of the first group 153 can be activated during the time intervals labelled 143a, 143c, 143e, and 143g. A second storage element 153b of the pair of storage elements of the first group can be activated during the time intervals labelled 143b, 143d, 143f, and 143h.

Similarly, during operation of the binary tree example shown in FIG. 1C, the timer 104 can also alternating activate the storage elements in the second group 152, such that only one storage element of the pair of storage elements 152a and 152b of the second group 152 is activated during each of the time intervals 142a-d. A first storage element 152a of the pair of storage elements of the second group 152 can be activated during the time intervals labelled 142a and 142c, and a second storage element 152b of the pair of storage elements of the second group 152 can be activated during the time intervals labelled 142b and 143d.

Similarly, during operation of the binary tree example shown in FIG. 1C, the timer 104 can also activate the storage elements in the third group 151, such that only one storage element of the pair of storage elements 151a and 151b of the third group 151 is activated during each of the time intervals 141a-b. A first storage element 151a of the pair of storage elements of the third group 151 can be activated during the time interval labelled 141a, and a second storage element 151b from the pair of storage elements of the third group can be activated during the time interval labelled 141b.

Charge corresponding to the received pulse 128 can be stored on activated elements from the first, second, and third groups. In the binary tree example illustrated in FIG. 1C, charge can be stored on the second element 153b of the first group 153 during the time interval 143d, charge can be stored on the second element 152b of the second group 152 during the time interval 142b, and charge can be stored on the first element 151a of the third group 151 during the time interval 141a. The processor can then determine a time of flight from the emitted lidar pulse 116 to the received pulse 126 based on which elements in the storage array 140 have stored charge corresponding to the received lidar pulse 126. In the example illustrated in FIG. 1C, each of the groups can represent a binary digit. In each of the groups, charge stored on the first element in the group can correspond to a binary zero and a charge stored on the second element in the group can correspond to a binary one. Thus, in the example illustrated in FIG. 1B, the time of flight of the lidar pulse 116 can be represented by the binary number "011."

Figure 2A:
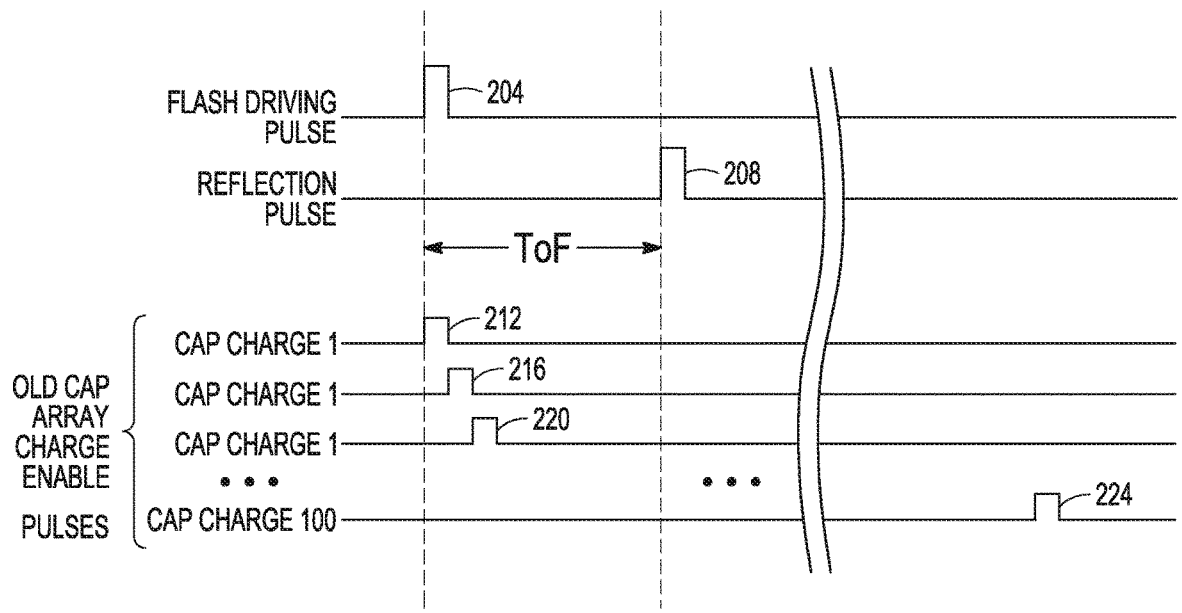

FIG. 2A illustrates an example of operation of an ungrouped proportional or sequential capacitor array approach, rather than a grouped binary tree or other grouped tree approach, as explained herein. In a proportional or sequential capacitor array approach, a time resolution can be proportional to the number of capacitors in the array in which each capacitor can be mapped to a unique time interval. A driving pulse 204 can be emitted towards a target by a transmitter, such as the transmitter 112. A reflected pulse 208 can then be received by a receiver, such as the receiver 128. A storage array, such as the storage array 140 can include an ungrouped array of capacitors, in which each capacitor can be activated for a single time interval, among a group of successive such intervals spanning an expected time of flight interval for receiving a reflected pulse. For example, the storage array can include an ungrouped array of one hundred capacitors. In an ungrouped approach, for comparison to the binary or other tree approach as explained herein, a timer, such as the timer 104 can sequentially successively activate each one of the one hundred capacitors for its designated time interval (e.g., 2 ns), such as by using a switching element or an array of switching elements. For example, a control pulse 212 can be used to activate a first capacitor during a first time interval, a control pulse 216 can be used to activate a second capacitor during a second time interval, a control pulse 220 can be used to activate a third capacitor 220 during a third time interval, and so on, until a control pulse 224 can activate the hundredth capacitor during a hundredth time interval of the entire time interval spanning the expected time of flight of the reflected pulse. Charge corresponding to the reflected pulse received by the receiver can be stored on one of the capacitors while activated. A time of flight can be determined from the capacitor having the stored charge. The time of flight can correspond to a difference between a leading edge of a driving pulse 204 issued by the lidar system and a leading edge of a reflected pulse 208 received by the lidar system. In the comparative example illustrated in FIG. 2A, a resolution of the ungrouped proportional or sequential capacitor array can be 30 cm over a distance of 30 m with each capacitor activated for a time interval of 2 ns.

Figure 2B:
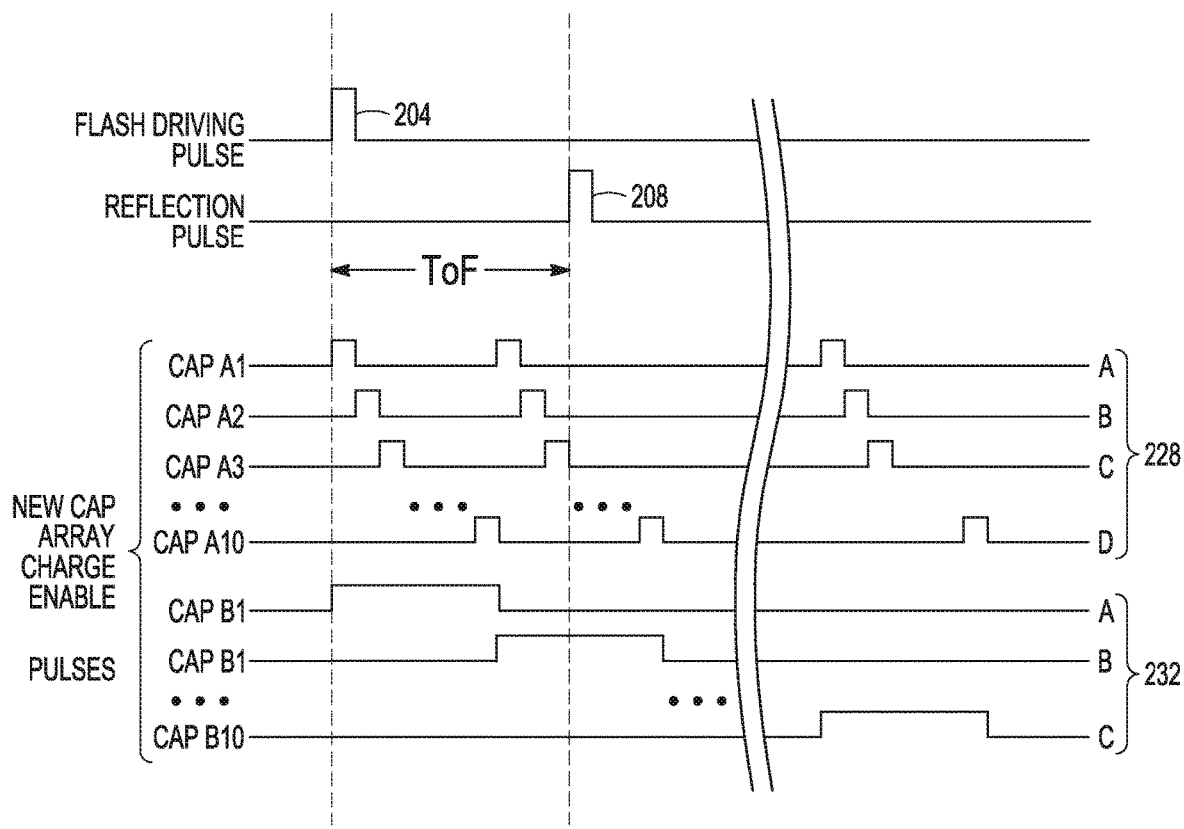

FIG. 2B illustrates an example of operation of a lidar system in which a reduced number of storage elements (e.g., capacitors) can be grouped into a binary or other tree arrangement and used to achieve the same accuracy as the ungrouped proportional or sequential example illustrated in FIG. 2A. In an illustrative grouped example, such as shown in FIG. 2B, the capacitors can be grouped into two groups, such as to reduce a number of capacitors to $2*n^{1/2}$, where n can represent a number of capacitors in the comparative ungrouped example illustrated in FIG. 2A. In an example in which the capacitors can be grouped into three groups, a number of capacitors can be reduced to to $3*n^{1/3}$, where n can represent a number of capacitors in the comparative ungrouped example illustrated in FIG. 2A. In an example in which the capacitors can be grouped into m groups, a number of capacitors can be reduced to $m*n^{1/m}$, where n can represent a number of capacitors in the comparative ungrouped example illustrated in FIG. 2A.

In the example illustrated in FIG. 2B, ten capacitors in a first group and ten capacitors in a second group can provide a resolution of 30 cm over a distance of 30 m. In such an example, the first group of capacitors can represent a first decimal digit of a time of flight and the second group of capacitors can represent a second decimal digit of the time of flight. More generally, a number of capacitors in the first group can correspond to a base of the digit represented by the first group, and a number of capacitors in the second group can correspond to a base of the digit represented by the second group. A driving pulse 204 can be emitted towards a target by a transmitter, such as the transmitter 112. A reflected pulse 208 can then be received by a receiver, such as the receiver 128. A series of control pulses 228 can sequentially activate the capacitors in the first group. Charge corresponding to the reflected pulse received by the receiver can be stored on one of the capacitors from the first group while activated. Individual capacitors in the first group can be activated for time intervals of 2 ns. The sequence of activation can be repeated a number of times, and the number of times can correspond to a number of elements in the second group. A series of control pulses 232 can sequentially activate the capacitors in the second group. Charge corresponding to the reflected pulse received by the receiver can be stored on one of the capacitors from the second group while activated. Capacitors in the second group can be activated for a time interval of 20 ns, and during activation of each of the capacitors in the second group, all of the capacitors in the first group can be sequentially activated. After all of the capacitors in the second group have been activated, a processor, such as the processor 160 can determine a capacitor from the first group having a stored charge and a capacitor from the second group having a stored charge corresponding to the received pulse. A time of flight can then be calculated from the determined capacitors. The time of flight can correspond to a difference between a leading edge of a driving pulse 204 issued by the lidar system and a leading edge of a reflected pulse 208 received by the lidar system.

In a lidar system, a strength of a reflected pulse (e.g. an intensity) can decrease for an increasing di stance between the lidar system and a target. The strength of the reflected pulse can decrease as a square of the distance or equivalently a square of the measured time of flight where the time of flight and the distance can be related by the equation, $d=ct/2$ as described above. FIG. 2C illustrates an example of operation of a lidar system in which an activation time of storage elements (e.g., capacitors) can vary, such as to compensate for a decreased signal strength that can occur at longer times of flight. The activation time of the storage elements can vary as a square of the time of flight. Similar to the example illustrated in FIG. 2B, the capacitors can be grouped into two groups. A driving pulse 204 can be emitted towards a target by a transmitter, such as the transmitter 112. A reflected pulse 208 can then be received by a receiver, such as the receiver 128. A series of control pulses 228 can activate the capacitors in the first group for successively increasing time intervals. A first control signal 236a can activate a first capacitor in the first group for a time of 1 ns, a second control signal 236b can activate a second capacitor in the first group for a time of 2 ns, a third control signal 236c can activate a third capacitor in the first group for a time of 4 ns, and a fourth control signal 236d can activate a fourth capacitor in the first group for a time of 8 ns. Then, the first control signal 236a can further activate the first capacitor in the first group for a time of 16 ns, the second control signal 236b can activate the second capacitor in the first group for a time of 32 ns, the third control signal 236c can activate the third capacitor in the first group for a time of 64 ns, and the fourth control signal 236d can activate the fourth capacitor in the first group for a time of 128 ns. A series of control pulses 240 can activate the capacitors in the second group for successively increasing time intervals. A first control signal 240a can activate a first capacitor in the second group for a time of 15 ns in which the 15 ns can correspond to a sum of the first activations of the first group (e.g., 1 ns+2 ns+4 ns+8 ns). A second control signal 240b can activate a second capacitor in the second group for a time of 240 ns in which the 240 ns can correspond to a sum of the second activations of the first group (e.g., 16 ns+32 ns+64 ns+128 ns). Charge corresponding to the reflected pulse received by the receiver can be stored on the capacitors while activated. The increasing activation time of the capacitors in the first and second group can compensate for a reduced intensity of reflected pulses received at later times that can correspond to an increased distance between the lidar system and the target.

Figure 2D:
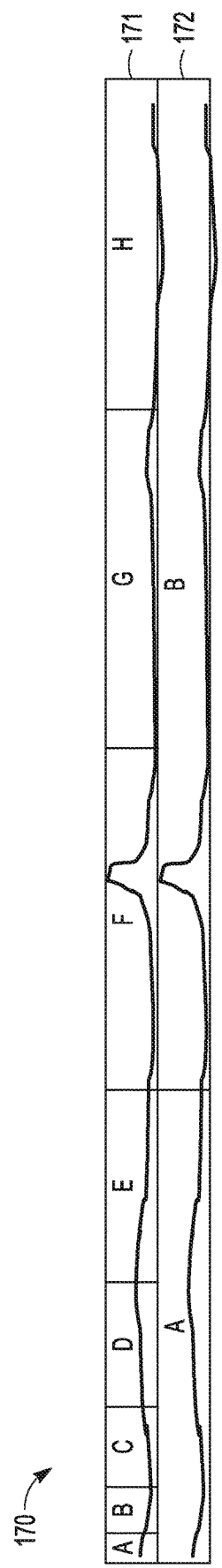

FIG. 2D illustrates an example of a method of operation of a lidar system where in which an activation time of storage elements (e.g., capacitors) can vary within a sequence of intervals, such as to compensate for a decreased signal strength that can occur at longer times of flight. A first group 162 can include four storage elements 162a-162d, a second group 161 can include two storage elements 161a and 161b. While activated, each storage element can store a charge. After a determination of a distance in the two-dimensional field of view corresponding to the target 124, a storage element can be discharged and/or reset.

In the example shown in FIG. 2D, storage elements can be activated for an amount of time that increases with an increasing time of flight. Each of the storage elements can be activated twice. For example, each storage element 162a-162d in the first group 162 can be alternatingly activated to alternatingly represent the Group 1 time epochs 172a-h. Each storage element 161a and 162b of the second group 162 can be alternatingly activated to alternatingly represent the Group 2 time epochs 172a-b.

Charge corresponding to the received pulse 128 can be stored on activated elements from the first and second groups. In the example illustrated in FIG. 2D, charge can be stored on the second element 162b of the first group 162 during the time interval 172f, and charge can be stored on the second element 161b of the second group 161 during the time interval 171b. The processor can then determine a time of flight of the emitted lidar pulse 116 based on which elements in the storage array 170 have stored charge corresponding to the emitted lidar pulse 116. In the example illustrated in FIG. 2D, a time of flight of the lidar pulse 116 can be determined to be within a 32 ns window corresponding to activation of the second element 162b during the time interval 172f. The 32 ns window can correspond to times of flight ranging from 31 ns to 62 ns. As can be seen from the example illustrated in FIG. 2D, a resolution of a time of flight can decrease for increasing times of flight in which the activation times of storage elements can increase to compensate for a reduction in a strength of a reflected pulse.

Figure 3:
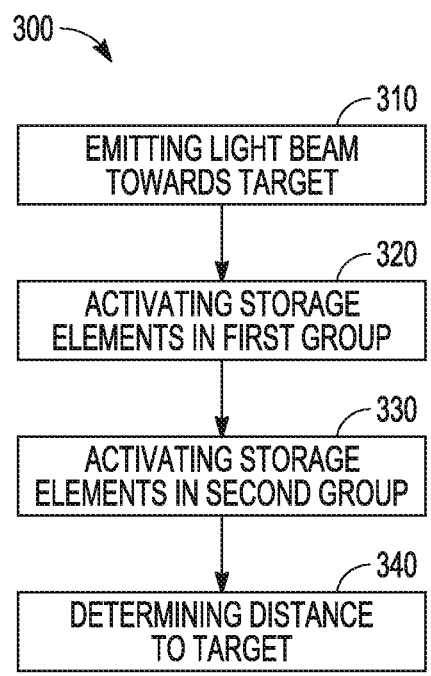
FIG. 3 illustrates an example of a method of operation of a lidar system.

FIG. 3 illustrates a method of operation of a lidar system, such as the lidar system 100. The lidar system can emit a light pulse, such as the light pulse 116, towards a target, such as the target 124 (step 310). A receiver, such as the receiver 128 can receive a portion of a light pulse reflected or scattered by the target. The received light pulse can be converted into a voltage, such as by using a transimpedance amplifier. The voltage can be used to store charge on one or more groups of storage elements. One or more storage elements in a first group can be activated, such as to store charge corresponding to the received light pulse on the one or more activated storage elements (step 320). Each storage element in the first group can be activated for a plurality of first time intervals (e.g., a time interval of 1 ns). The storage elements in the first group can correspond to a first digit of a time of flight. One or more storage elements in a second group can be activated, such as to store charge corresponding to the received light pulse on the one or more activated storage elements (step 330). The storage elements in the second group can be activated during one of a plurality of second time intervals (e.g., a time interval of 10 ns). The storage elements in the second group can correspond to a second digit of the time of flight. All of the storage elements can be sequentially activated during each of the plurality of second time intervals. A duration of each of the second time interval can be at least twice as long as a duration of the first time interval. A time of flight can be determined from the storage elements having a stored charge and a distance to the target can be determined from the time of flight (step 340). An $n^{th}$ element from the first group of storage elements and an $m^{th}$ element from the second group of storage elements corresponding to a received portion of the light beam can be determined based on which of the storage elements have a stored charge. The round trip travel time can then be determined by summing a product of n and a length of the first time interval and a product of m and a length of the second time interval.

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for determining a round trip travel time of a light beam in a lidar system, the method comprising:

activating individual charge storage elements in a first group of charge storage elements, with respective individual charge storage elements being activated during a plurality of first time intervals, each corresponding to a first duration;

activating individual charge storage elements in a second group of charge storage elements, with respective individual charge storage elements being activated during a plurality of second time intervals, each corresponding to a second duration longer than the first duration; and determining a round trip travel time of the light beam based on determined individual charge storage elements from the first and second groups of charge storage elements corresponding to a received portion of the light beam;

wherein the first and second groups of charge storage elements correspond to different digits in the round trip travel time.

2. The method of claim 1, wherein intervals of activation of successive charge storage elements are established in a decimal tree or binary tree progression.

3. The method of claim 1 wherein the second duration is at least two times the length of the first duration.

4. The method of claim 1 comprising determining an individual charge storage element from the first group of charge storage elements activated during a plurality of first time intervals corresponding to the received portion of the light beam.

5. The method of claim 1 comprising determining an individual charge storage element from the second group of charge storage elements activated during one of the second time intervals corresponding to the received portion of the light beam.

6. The method of claim 1 comprising determining an $n^{th}$ element from the first group and an $m^{th}$ element from the second group corresponding to a received portion of the light beam and determining a round trip travel time by summing a product of n and a length of the first time interval and a product of m and a length of the second time interval.

7. A method for determining a round trip travel time of a light beam in a lidar system, the method comprising:
    activating individual charge storage elements in successive groups of charge storage elements, wherein a charge storage element in a group amongst the successive groups is activated for a longer time interval than a charge storage element in a preceding group; and
    determining a round trip travel time of the light beam based on determined individual charge storage elements from amongst the successive groups of charge storage elements corresponding to a received portion of the light beam;
    wherein the charge storage element in the group amongst the successive groups is activated for a time interval at least twice the length of a time interval of activation of the chaerg storage element in a preceding group.

8. The method of claim 7, wherein intervals of activation of successive charge storage elements are established in a decimal tree or binary tree progression.

9. The method of claim 7 comprising repeatedly activating individual charge storage elements in a first one of the successive groups of charge storage elements and wherein a charge storage element in a second group of the successive groups of charge storage elements is repeatedly activated for a time interval corresponding to activation of each of the individual charge storage elements in the first one of the successive groups of charge storage elements.

10. The method of claim 7 comprising activating individual charge storage elements in at least one of the successive groups of charge storage elements for a variable time interval.

11. The method of claim 10 comprising activating individual charge storage elements in at least one of the successive groups of charge storage elements for a time interval that varies exponentially.

12. The method of claim 7 where each successive group of charge storage elements includes an exponentially smaller number of charge storage elements than a preceding group of charge storage elements.

13. A system for determining a round trip travel time of a light pulse in a lidar system, the system comprising:
    a light transmission system configured to emit a pulse of light towards a target;
    a receiver configured to receive a pulse of light from the target;
    a first group of charge storage elements;
    a second group of charge storage elements; and
    control circuitry configured to:
    activate individual charge storage elements in the first group of charge storage elements, with respective individual storage elements being activated during a plurality of first time intervals, each of the corresponding first time intervals having a first duration;
    activate individual charge storage elements in the second group of charge storage elements, with respective individual charge storage elements being activated during a plurality of second time intervals, each corresponding to a second duration longer than the first duration; and
    determine a round trip travel time of the light pulse based on the individual charge storage elements from the first and second groups of charge storage elements corresponding to a received portion of the light pulse;
    wherein the first group of charge storage elements corresponds to a first digit of the round trip travel time and the second group of charge storage elements corresponds to a second digit of the round trip travel time.

14. The system of claim 13, wherein the second duration is at least two times the length of the first duration.

15. The system of claim 13 wherein intervals of activation of the first group and second group of charge storage elements are established in a decimal tree or binary tree progression.

16. The system of claim 13 wherein the control circuitry is configured to determine an individual charge storage element from the first group of charge storage elements activated during a plurality of first time intervals corresponding to the received portion of the light beam.

17. The system of claim 13 wherein the control circuitry is configured to determine an individual charge storage element from the second group of charge storage elements activated during one of the second time intervals corresponding to the received portion of the light beam.

18. The system of claim 13 wherein the control circuitry is configured to determine an $n^{th}$ element from the first group and an $m^{th}$ element from the second group corresponding to a received portion of the light beam and determine a round trip travel time by summing a product of n and a length of the first time interval and a product of m and a length of the second time interval.

19. The system of claim 13 wherein a number of the first group of charge storage elements is exponentially larger than a number of charge storage elements in the second group of charge storage elements.

20. The system of claim 13 further comprising a third group of charge storage elements, wherein the control circuitry is configured to:
    activate individual charge storage elements in the third group of charge storage elements, each individual charge storage element being activated during one of a plurality of third time intervals, each having a third duration shorter than the first duration; and determine a round trip travel time of the light pulse based on the individual charge storage elements from the first, second, and third group of charge storage elements corresponding to a received portion of the light pulse.

* * * * *